May 28, 1929. V. J. HARRIS 1,714,779

BRAKE SHAFT SILENCER

Filed Aug. 10, 1928

INVENTOR.
Vernon J. Harris
BY Parker & Burton
ATTORNEYS

Patented May 28, 1929.

1,714,779

UNITED STATES PATENT OFFICE.

VERNON J. HARRIS, OF CLEVELAND, OHIO.

BRAKE-SHAFT SILENCER.

Application filed August 10, 1928. Serial No. 298,672.

My invention relates to an improved spring silencer for the operating shafts of vehicle brake mechanism and is particularly intended to be employed to prevent the undesirable rattle of a pair of spaced apart aligned parallel brake operating shafts arranged within a bearing providing relative play between the shafts.

An object is the provision of a simple inexpensive spring silencer which may be readily inserted without the use of special tools between the brake operating shafts, the rattling of which is to be minimized.

The various specific advantages and features of my invention will more fully appear from the following specification, appended claims and accompanying drawing, wherein,—

Figure 2:
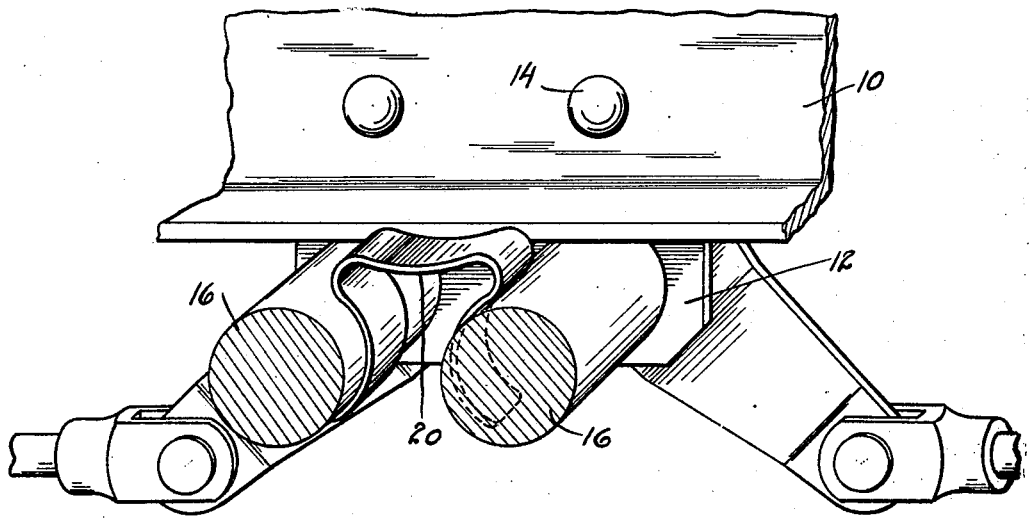
Fig. 2 is a perspective partly in section showing my silencer in position.

My improved silencer is intended to be employed in conjunction with a particular type of brake shaft mounting and this mounting is shown in the figures of the drawing.

In the drawing, 10 indicates chassis frame members arranged on opposite sides of the chassis. Each of these frame members carries a bearing 12 which may be secured thereto in any suitable fashion as by rivets 14 and this bearing serves as a support for a pair of brake shafts 16. Brake connections 18 extend from one shaft to the brakes at one end of the vehicle and from the other shaft to the brakes at the opposite end of the vehicle.

The shafts are supported by the bearings in spaced apart parallelism. There is a tendency for these shafts, after a certain amount of wear at least, to rattle, and my improved silencer is provided for the purpose of eliminating this rattle.

Figure 1:
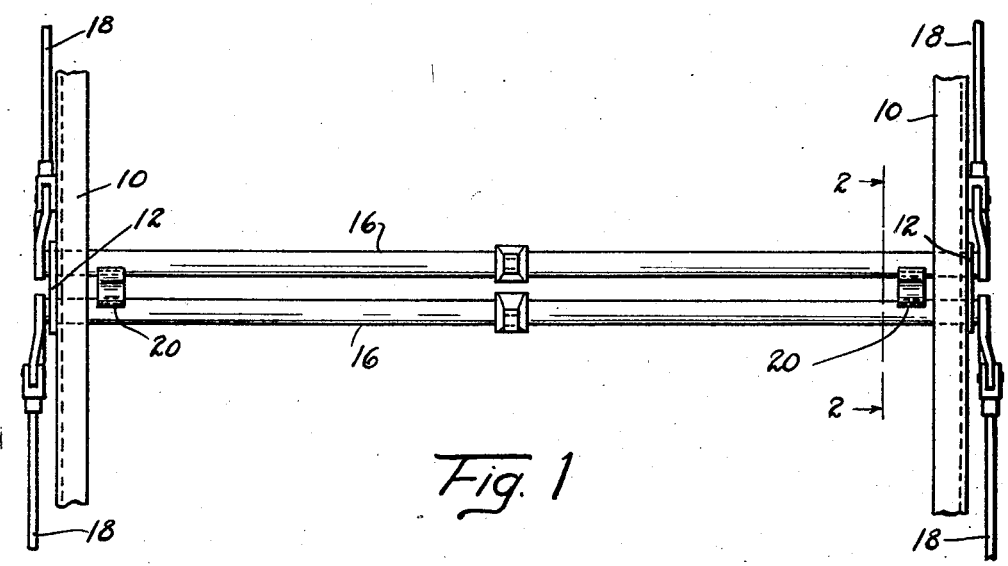
Fig. 1 is a plan of a fragment of a vehicle chassis showing my improved silencer in position between a pair of brake operating shafts.

I provide a pair of silencing devices indicated generally as 20 which are interposed between the shafts, as shown in the figures of the drawing, adjacent the supporting bearings for the shafts, as shown particularly in Fig. 1.

Each silencer comprises a flat spring metal U-shaped structure, shown more particularly in Fig. 2, which has a pair of legs or side members that are generally outwardly concave to partially embrace the shafts as shown in such figure of the drawing, which side members are connected by an intervening or bottom portion generally outwardly concave so as to project inwardly between said side members. This silencer, when inserted in position between the shafts, exerts a tension outwardly on both shafts tending to hold them against the bearings and prevent their rattle therein and it is so constructed that it is readily capable of insertion in place between the shafts without the employment of special equipment or tools.

I claim:

1. The combination, in mechanism of the class described, of a pair of aligned parallel shafts; a pair of bearings, one for each end of said shafts and within which said shafts are supported in aligned spaced apart parallelism; a pair of spring silencers, one for each end of said shafts, arranged between said shafts, each silencer consisting of a flat expansible U-shaped spring member having outwardly concave legs seating against shafts and connected by an inwardly convex portion.

2. In brake mechanism, a pair of parallel aligned brake shafts, a bearing at each end of said shafts through which the shafts extend and by which they are supported in aligned spaced apart parallelism, a pair of spring silencers arranged between said shafts and between the bearings therefor, one silencer disposed in proximity to one end of the shaft and the other silencer disposed in proximity to the other end of the shaft, both silencers arranged between the bearings for the shafts and one in proximity to each bearing, each silencer comprising a flat expansible U-shaped spring member having opposite sides tensioned outwardly and outwardly concave to embrace the shafts and a bottom connecting said sides inwardly convex between the sides thereof.

In testimony whereof, I, VERNON J. HARRIS, sign this specification.

VERNON J. HARRIS.